(12) United States Patent
Vialle

(10) Patent No.: US 8,845,489 B2
(45) Date of Patent: Sep. 30, 2014

(54) POWERPLANT AND A METHOD OF DRIVING A MECHANICAL SYSTEM VIA SAID POWERPLANT

(75) Inventor: Michel Vialle, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 1260 days.

(21) Appl. No.: 12/708,722

(22) Filed: Feb. 19, 2010

(65) Prior Publication Data

US 2010/0212326 A1    Aug. 26, 2010

(30) Foreign Application Priority Data

Feb. 23, 2009    (FR) .................................. 09 00810

(51) Int. Cl.
| | |
|---|---|
| F16H 61/48 | (2006.01) |
| F16H 59/74 | (2006.01) |
| B64D 35/00 | (2006.01) |
| B64C 27/12 | (2006.01) |
| F02C 7/36 | (2006.01) |
| F01D 15/12 | (2006.01) |
| B64C 13/34 | (2006.01) |
| F01D 15/02 | (2006.01) |
| F16H 3/10 | (2006.01) |

(52) U.S. Cl.
CPC ............. *F01D 15/02* (2013.01); *B64C 27/12* (2013.01); *F02C 7/36* (2013.01); *F01D 15/12* (2013.01); *B64C 13/34* (2013.01); *F16H 3/10* (2013.01)
USPC ................. 477/55; 477/52; 477/107; 74/718; 244/60

(58) Field of Classification Search
CPC ..... F16H 2037/088; F16H 3/089; F16H 3/78; B60W 10/02; B64C 27/12; B64C 13/34
USPC ................. 477/52, 55, 175; 74/718; 244/60
See application file for complete search history.

(56) References Cited

U.S. PATENT DOCUMENTS

| | | | | |
|---|---|---|---|---|
| 3,541,885 | A | * | 11/1970 | Burcz .............................. 74/720 |
| 4,320,633 | A | * | 3/1982 | Humphrey ....................... 192/32 |
| 4,441,384 | A | * | 4/1984 | Watson et al. ............ 74/665 GA |
| 4,542,722 | A | | 9/1985 | Reynolds |
| 7,296,767 | B2 | * | 11/2007 | Palcic et al. ................. 244/17.11 |
| 2008/0081733 | A1 | * | 4/2008 | Hattenbach et al. ........... 477/107 |

FOREIGN PATENT DOCUMENTS

| | | |
|---|---|---|
| DE | 763 176 | 9/1953 |
| FR | 2 670 553 | 6/1992 |
| GB | 2 122 285 | 1/1984 |
| GB | 2 429 500 | 2/2007 |
| WO | 2007/86906 | 8/2007 |

OTHER PUBLICATIONS

French Search Report dated Oct. 2, 2009, from corresponding French application.

* cited by examiner

*Primary Examiner* — Edwin A Young
*Assistant Examiner* — Colby M Hansen
(74) *Attorney, Agent, or Firm* — Brooks Kushman P.C.

(57) ABSTRACT

A powerplant (8) is provided with a drive shaft (4) and at least one engine (1) having an outlet shaft (2) that is necessarily set into rotation during starting of the engine (1), the drive shaft (4) being suitable for setting a mechanical system (7) into motion. The powerplant (8) includes a link member (3) having a clutch (15) and a declutchable freewheel (25) for mechanically linking the outlet shaft (2) to the drive shaft (4).

18 Claims, 1 Drawing Sheet

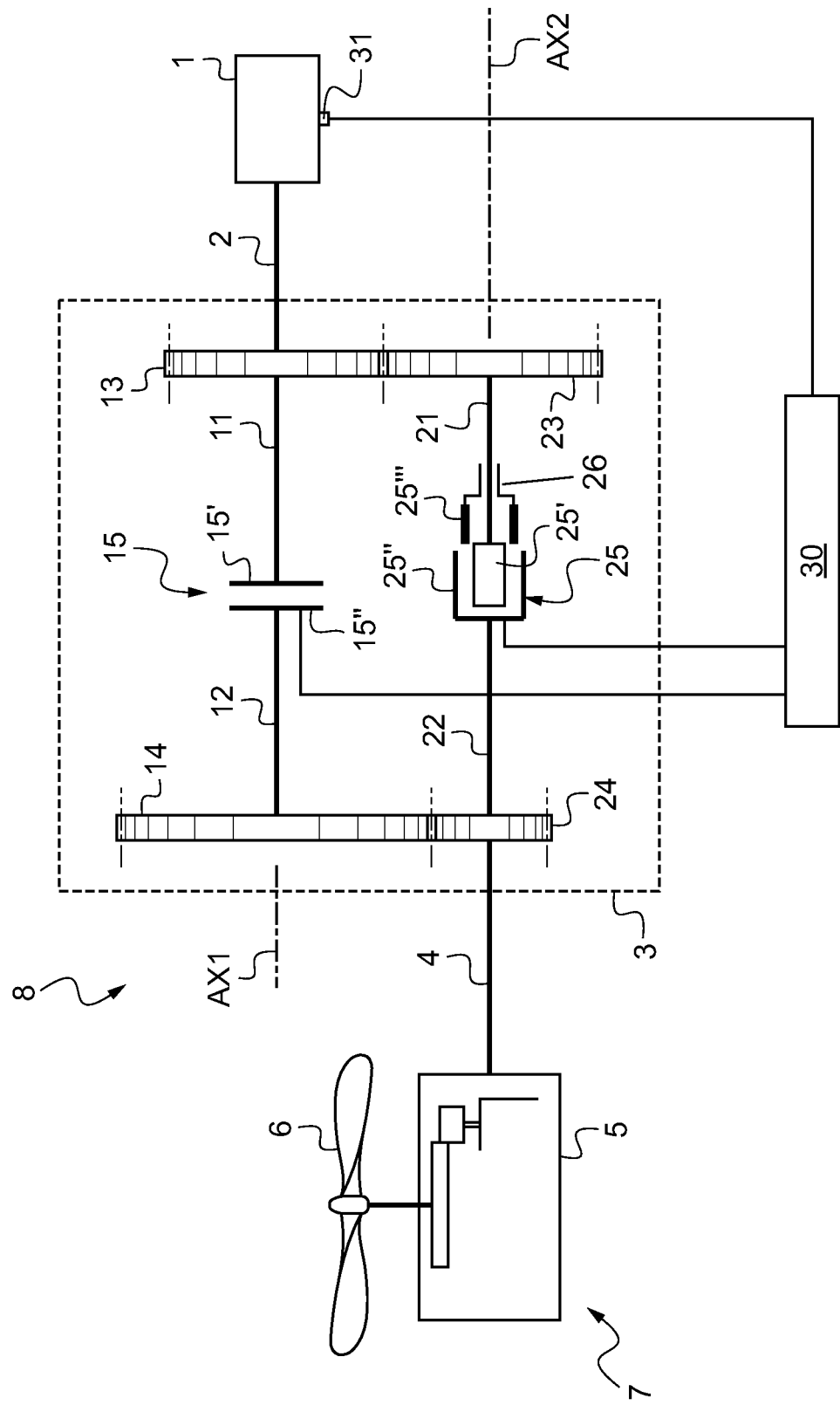

POWERPLANT AND A METHOD OF DRIVING A MECHANICAL SYSTEM VIA SAID POWERPLANT

FIELD OF THE INVENTION

The present invention relates to a powerplant, and to a method of driving a mechanical system via said powerplant.

For example, the powerplant is a powerplant for a rotorcraft, such as a helicopter. The powerplant is then provided with at least one engine having an outlet shaft for setting a main gearbox into motion in order to drive the main propulsion and lift rotor of the helicopter in rotation.

BACKGROUND OF THE INVENTION

In order to drive the main lift and propulsion rotor of a rotorcraft, such as a helicopter, via a main power gearbox, a first known solution relies on using a turbine engine known as a "free turbine engine".

A free turbine engine includes a gas generator comprising in succession at least one compressor, a combustion chamber, and at least one expansion turbine, the compressor being mechanically linked to the expansion turbine by a main shaft.

It is possible to provide the compressor with a plurality of compression stages that may be axial and/or centrifugal, and the expansion turbine may present a plurality of expansion stages.

Following on from the gas generator, there is arranged a working free turbine that is secured to the outlet shaft of the turbine engine. The main shaft of the gas generator and the outlet shaft are then distinct. Consequently, a free turbine engine is sometimes referred to as a "two-shaft" engine.

In operation, the turbine engine sucks in ambient air. The air is then compressed prior to being directed into the combustion chamber.

A fuel is injected under pressure into the combustion chamber and then burnt together with the compressed air.

The gas that results from the combustion is then taken to the expansion turbine where it is expanded.

This gas thus drives the expansion turbine in rotation about its axis of rotation.

It should be observed that the expansion turbine drives the compressor of the gas generator in rotation by means of the main shaft.

The gas coming from the expansion turbine of the gas generator then sets the power free turbine into rotation, which in turn drives the outlet shaft of the turbine engine, and consequently drives the main power gearbox.

In order to start a free turbine engine, it is possible to use a starter that sets the main shaft of the engine into rotation.

Since the main shaft is not secured to the outlet shaft in a "two-shaft" engine, the starter can be optimized and there is no necessity for the starter to be overdimensioned.

Furthermore, and with reference to document WO 2007/086906, it is appropriate to arrange a freewheel on the outlet shaft in order to enable a rotorcraft having a turbine engine to perform autorotation.

Thus, that document describes a turbine engine suitable for driving a special transmission gearbox having a main gearbox and a variable-speed gearbox, the variable-speed gearbox enabling the turbine engine to drive a rotor at two different speeds.

A freewheel is then arranged on the outlet shaft from the turbine engine, between the body of the turbine engine and the variable speed gearbox.

Thus, in the event of the turbine engine breaking down, the freewheel guarantees that if the free turbine of the turbine engine is being prevented from rotating that will not also cause the main rotor from being prevented from rotating.

It should be observed that document WO 2007/086906 implements conventional freewheels.

A conventional freewheel is usually provided with a driving portion and a drivable portion, at least one ball being arranged between a sloping ramp of the driving portion and a circular surface of the drivable portion. Thus, when the drivable portion is rotating faster than the driving portion, said ball is at the bottom of the sloping ramp, thereby disconnecting the drivable and driving portions.

Conversely, when the driving portion is rotating faster than the drivable portion, the ball moves up the sloping ramp and thus becomes wedged between the driving portion and the drivable portion. Consequently, the driving portion sets the drivable portion into rotation via said ball. The drivable and driving portions are then constrained to rotate together.

In addition to the conventional freewheels implemented in document WO 2007/086906, freewheels are also known that are suitable for being disconnected and that are entirely different from a conventional simple freewheel. A freewheel that is suitable for being disconnected operates in two distinct connection modes:

a disconnected mode, in which the driving portion of the freewheel is unable under any circumstances to set the drivable portion thereof into motion; and a freewheel mode, in which the driving portion of the freewheel sets the drivable portion thereof into rotation as soon as the first speed of rotation of the driving portion becomes greater than a second speed of rotation of the drivable portion, whereas in contrast said driving portion of the freewheel is not suitable for setting said drivable portion into rotation when the first speed of rotation is less than the second speed of rotation.

Reference may be made to the literature in order to find embodiments of a freewheel that is suitable for being disconnected.

By way of example, in a first embodiment described in document FR 2 670 553, the balls of a conventional freewheel are replaced by rollers arranged in a cage that is movable along the longitudinal axis of the freewheel. Thus, in disconnected mode, in a first position, the rollers are not between the driving and drivable portions and can under no circumstances transmit motion from the driving portion to the drivable portion. In contrast, in freewheel mode, the rollers are in a second position where they are arranged between the driving and drivable portions so as to be capable of transmitting motion from the driving portion to the drivable portion, where appropriate.

Compared with conventional freewheels, the term "declutchable" freewheel is used for convenience below in order to designate such freewheels that are suitable for being disconnected.

It should be observed that a declutchable freewheel is sometimes referred to by the person skilled in the art as a "disconnectable" freewheel (roue libre "décrabotable" in French language). Indeed, the succession of ramps on its driving portion gives rise to a succession of dog, i.e. dog-clutch-like faces between each adjacent pair of ramps.

In addition to free turbine engines, it is possible to use a turbine engine that may be referred to as a "linked turbine" engine.

A linked turbine engine is provided with a gas generator of the type described above.

In operation, the engine sucks in ambient air. This air is then compressed prior to being directed into the combustion chamber.

Fuel is injected under pressure into the combustion chamber where it is burnt with the compressed air.

The gas that results from the combustion is then taken to the expansion turbine in order to be expanded.

This gas then drives said expansion turbine in rotation about is axis of rotation.

The expansion turbine drives the compressor of the gas generator in rotation by means of the main shaft.

In addition, the main shaft serves not only to link the compressor to the expansion turbine. In a linked-turbine engine, the main shaft also constitutes the outlet shaft from the engine, and is suitable for setting a main gearbox into motion, e.g. in a helicopter.

Thus, linked-turbine engines are sometimes referred to as "single-shaft" turbine engines.

In order to start a linked-turbine engine, an external starter is used that sets the compressor into rotation. However, unlike a free turbine engine, the main shaft and the outlet shaft constitute a single shaft, so the starter must also drive the outlet shaft and thus the main rotor in rotation as well.

Consequently, the starter needs to be overdimensioned in order to perform its function, thereby giving rise to unreasonable cost, size, or indeed fuel consumption, and also to excessive weight.

This drawback explains in particular why linked-turbine engines are rarely used in rotorcraft, where nominal weight targets in particular are recurrent for this type of aircraft.

The same applies to piston engines whether reciprocating or rotary, since they present the same drawbacks.

In order to overcome that difficulty, it is common practice to install a clutch, of the centrifugal friction type, on the outlet shaft. A driving portion of the clutch is then secured to the outlet shaft while a driven portion of the clutch is secured to a shaft for driving the gearbox.

On starting, the clutch is declutched. Thus, the outlet shaft is no longer connected to the main rotor, thus making it possible to optimize the performance of the starter.

In contrast, once the engine has started, whether it is the turbine engine or a piston engine, the clutch is clutched so that the outlet shaft can drive the main rotor via the main gearbox.

Although effective, that device presents drawbacks. After starting, the clutch is subjected to high levels of torque and runs the risk of its driving portion slipping relative to its driven portion. This gives rise to non-negligible levels of wear in the device.

Similarly, in flight, the risk of slipping remains, given the presence of large fluctuations in torque.

Consequently, the clutches are greatly overdimensioned in order to avoid any risk of slip, and they require frequent and expensive maintenance operations.

OBJECT AND SUMMARY OF THE INVENTION

The present invention thus lies in the technical field restricted to powerplants implementing a "single-shaft" engine, whether a linked-turbine engine or a piston engine, and it sets out to provide a powerplant making it possible to overcome the above-mentioned limitations. More precisely, the invention seeks to provide a powerplant provided with an engine having an outlet shaft that is necessarily set into rotation when said engine is started, said powerplant requiring neither an overdimensioned starter nor an overdimensioned clutch.

According to the invention, a powerplant is provided with a drive shaft and at least one engine having an outlet shaft necessarily set into rotation on starting the engine, the drive shaft being suitable for setting a mechanical system into motion of the rotorcraft main gearbox. This powerplant is remarkable in that includes a link member provided with a clutch and a declutchable freewheel for linking the outlet shaft mechanically to the drive shaft.

It should be observed that a declutchable freewheel is conventionally provided with a driving portion and a drivable portion, i.e. a portion that suitable for being driven by the driving portion.

As mentioned above, such a declutchable freewheel is quite different from a simple freewheel. In addition, it can be seen that the present state of the prior art does not envisage using such a declutchable freewheel for solving the problem posed.

Indeed, the document GB 2122285 describes a gearbox linking an output shaft of an engine to a driving shaft.

The gearbox is provided with three parallel main shafts and with two connection means. Each connection mean comprises a simple freewheel having an internal portion and an external portion secured to a disk of a clutch.

It is the same thing for the document DE 763176 which shows some clutches.

Finally, the document US 2008/081733 discloses a device having a torque converter and a mechanical connection mean, said mechanical connection being a clutch suitable to connect or disconnect two shafts. Furthermore, the clutch may be made in numerous manners without going beyond the ambit of the invention. For example, the clutch may be a friction centrifugal clutch as is widely described in the literature, for example a clutch of the type used on board helicopters and known under the trade name AS361.

By using such a link member, and as explained below, there is no need to provide an overdimensioned clutch for a powerplant, e.g. a plant having a linked-turbine engine or a reciprocating or rotary piston engine. Similarly, the invention does not require a freewheel to be provided, e.g. that is dedicated to enabling autorotation of a rotorcraft, insofar as the declutchable freewheel also performs that function.

The invention also includes one or more of the following additional and non-essential characteristics.

For example, a powerplant with the declutchable freewheel operates either in a disconnected mode during which the driving portion of the declutchable freewheel can under no circumstances set a drivable portion of said declutchable freewheel into motion, or in a freewheel mode during which the driving portion sets the drivable portion into motion as soon as the speed of rotation of the driving portion, i.e. a first speed of rotation becomes greater than the speed of rotation of the drivable portion, i.e. a second speed of rotation, whereas in contrast the driving portion is not suitable for setting said drivable portion into rotation when the first speed of rotation is lower than the second speed of rotation.

Advantageously, the link member is suitable for linking the outlet shaft mechanically to the drive shaft, either via the clutch or via the declutchable freewheel. Under such circumstances, in order to avoid overdimensioning the clutch, no use is made of a mode of operation in which the clutch and the declutchable freewheel are used in parallel.

In addition, the link member optionally includes:

first and second primary shafts secured to the clutch, the first primary shaft being provided with a first primary toothed wheel having a first number of teeth, and the second primary shaft being provided with a second primary toothed wheel having a second number of teeth; and first and second secondary shafts secured to the declutchable freewheel, the first secondary shaft being provided with a first secondary toothed wheel provided with a third number of teeth meshing with the first primary toothed wheel, the second secondary shaft being provided with a second secondary toothed wheel provided with a fourth number of teeth meshing with the second primary toothed wheel.

More precisely, a driving part of the clutch is secured to the first primary shaft, while a driven part of the clutch is secured to the second primary shaft.

Likewise, the driving portion of the declutchable freewheel is secured to the first secondary shaft, while the drivable portion of the declutchable freewheel is secured to the second secondary shaft.

In addition, the first and second primary shafts are located on a common first axis of rotation, the first and second secondary shafts are located on a second common axis of rotation, and the first and second primary shafts are parallel to the first and second secondary shafts in order to optimize the operation of the link member.

Furthermore, a first quotient, given by the third number of teeth divided by the first number of teeth, is advantageously greater than unity, and the product of the first quotient multiplied by a second quotient, given by the second number of teeth divided by the fourth number of teeth, is also greater than unity.

In addition, the outlet shaft is constrained to rotate with the first primary toothed wheel or with the first secondary toothed wheel.

Likewise, the drive shaft is constrained to rotate with the second primary toothed wheel or with the second secondary toothed wheel.

Finally, the powerplant includes at least one control means for controlling the clutch and the declutchable freewheel. The control means may comprise manual control means suitable for being activated via pilot or automatic control means.

The present invention also provides a method implemented using the powerplant.

According to the invention, a method of driving a mechanical system via a powerplant having a drive shaft and at least one engine with an outlet shaft that is necessarily set into rotation on starting the engine, the drive shaft engaging the mechanical system in order to set it into motion, the powerplant including a link member provided with a clutch and a declutchable freewheel in order to link the outlet shaft mechanically to the drive shaft, is remarkable in particular in that:

during a starting stage, the clutch is declutched and the declutchable freewheel is declutched so as to disconnect the outlet shaft from the drive shaft;

during an intermediate stage of operation, the clutch is clutched and the declutchable freewheel is kept declutched so as to connect the outlet shaft to the drive shaft solely via the clutch; and during a stabilized stage of operation, the clutch is declutched and the declutchable freewheel is clutched so as to connect the outlet shaft to the drive shaft via the declutchable freewheel.

Consequently, on starting, the clutch is declutched and the declutchable freewheel is declutched. It should be observed that these two operations may be performed simultaneously or in succession, with the declutchable freewheel being declutched after the clutch is declutched. The outlet shaft is not capable of setting the drive shaft and thus the mechanical system into motion insofar as the clutch is declutched and the declutchable freewheel is declutched.

There is then no need to make use of a starter that is particularly powerful.

The engine manufacturer defines a minimum idling speed for the engine in conventional manner, and once it reaches its minimum idling speed and is thus developing an idling torque level (first torque level), the transition occurs from the starting stage to an intermediate stage of operation. The clutch is then clutched while the declutchable freewheel is kept declutched.

The driving part of the clutch drives the driven part thereof in rotation. Under such circumstances, the outlet shaft of the engine drives the drive shaft of the mechanical system in particular via the clutch of the link member, but not via the declutchable freewheel which continues to be declutched.

Since the level of torque is low, there is no risk of encountering slip in the clutch.

The clutch is designed to be capable of transmitting an optimum level of torque lying between the idling torque level and a maximum torque level (second torque level) as developed by said engine, and when the level of torque developed by the engine reaches said optimum torque for said clutch, a transition is performed from the intermediate mode of operation to a stabilized mode of operation. Thus, the clutch is declutched and the declutchable freewheel is clutched, either simultaneously or in succession, with the declutchable freewheel being clutched after the clutch has been declutched, for example. The outlet shaft of the engine then drives the drive shaft of the mechanical system, specifically via the declutchable freewheel of the link member, instead of via its clutch, thus making it possible to avoid any risk of slip.

Consequently, the manufacturer dimensions the clutch so as to match its optimum operating torque without slip as a function of requirements, this optimum torque being as far removed as possible from the maximum torque level, while remaining greater than the idling torque level.

BRIEF DESCRIPTION OF THE DRAWING

The invention and its advantages appear in greater detail from the following description of an embodiment given by way of illustration with reference to the sole accompanying FIGURE.

The sole FIGURE shows a powerplant 8 suitable for setting a mechanical system 7 into motion. The mechanical system 7 in the example shown is constituted by a main transmission gearbox 5 of a rotorcraft together with a main rotor 6 of the rotorcraft.

MORE DETAILED DESCRIPTION

Under such circumstances, the powerplant 8 comprises in succession: an engine 1 having an outlet shaft 2. The engine 1 is an engine of the "single-shaft" type, e.g. a turbine engine with a linked turbine, or even a piston engine.

In order to avoid implementing a starter of excessive power, the powerplant includes a link member 3 connected firstly to the outlet shaft 2 and secondly to a drive shaft 4 of the powerplant and suitable for driving the main gearbox 5.

The link member 3 then serves to link the outlet shaft 2 of the engine 1 mechanically to the drive shaft 4 under certain conditions of operation of the engine 1, in particular while the rotorcraft is in flight.

Consequently, the link member 3 has a clutch 15 provided with a driving part 15' and a driven part 15", and a declutchable freewheel 25 provided with a driving portion 25' and a drivable portion 25". It should be observed that the driving part 15' of the clutch 15 drives said driven part 15" in rotation when the clutch 15 is clutched.

Likewise, the declutchable freewheel 25 has a driving portion 25', a drivable portion 25", and a plurality of rollers 25'" placed in a cage 26 so as to be movable longitudinally.

In disconnected mode, as shown in the single FIGURE, the rollers are withdrawn from the driving and drivable portions 25' and 25". As a result, these driving and drivable portions 25' and 25" are not constrained to rotate with each other in this disconnected mode.

In freewheel mode (not shown), the rollers are moved longitudinally so as to be located between the driving and drivable portions 25' and 25". The driving portion 25' of the declutchable freewheel sets the drivable portion 25" into rotation firstly when the freewheel is clutched, and secondly as soon as the speed of rotation of the driving portion 25' becomes greater than the speed of rotation of the drivable portion 25".

Where necessary, reference may be made to the literature to obtain more information about declutchable freewheels.

Thus, when the engine 1 is started, the clutch 15 is declutched and the declutchable freewheel is declutched and thus in disconnected mode. The link member 3 then does not link the outlet shaft 2 to the drive shaft 4. Rotation of the outlet shaft 2 during starting therefore does not give rise to rotation of the main rotor 6, thereby making it possible to use a starter of optimized dimensions.

In contrast, after the starting stage, the link member 3 links the outlet shaft 2 mechanically to the drive shaft 4 via the clutch 15 while the engine 1 is developing relatively low torque, and via the declutchable freewheel while the engine 1 is developing relatively high torque.

For this purpose, the link member 3 has first and second primary shafts 11 and 12 that are secured respectively to the driving part 15' and to the driven part 15" of the clutch 15.

Likewise, the link member 3 has first and second secondary shafts 21 and 22 secured respectively to the driving portion 25' and to the drivable portion 25" of the declutchable freewheel.

The first and second primary shafts 11 and 12 are placed on a common first axis of rotation AX1, and the first and second secondary shafts 21 and 22 are placed on a common second axis of rotation AX2 parallel to the first axis of rotation AX1.

The first primary shaft 11 is provided with a first primary toothed wheel 13 having a first number of teeth P1, and the first secondary shaft 21 is provided with a first secondary toothed wheel 23 provided with a third number of teeth R1 meshing with the first primary toothed wheel 13.

In similar manner, the second primary shaft 12 is provided with a second primary toothed wheel 14 having a second number of teeth P2, and the second secondary shaft 22 is provided with a second secondary toothed wheel 24 provided with a fourth number of teeth R2 meshing with the second primary toothed wheel 14.

The first, second, third, and fourth numbers of teeth P1, P2, R1, and R2 are then determined on the basis firstly of a first quotient Q1 given by the third number of teeth R1 divided by the first number of teeth P1, and secondly of a second quotient Q2 given by the second number of teeth P2 divided by the fourth number of teeth R2, i.e.:

$$Q1 = \frac{R1}{P1}$$

$$Q2 = \frac{P2}{R2}$$

Under such circumstances, the first and second quotients Q1 and Q2 ideally comply with the following first and second conditions:

$$Q1 > 1$$

$$Q1 * Q2 > 1$$

where "*" represents the multiplication sign.

In order to be capable of being mechanically linked to the drive shaft 4 by the link member 3, the outlet shaft 2 is fastened to the first primary toothed wheel 13 in order to be constrained to rotate therewith about the first axis of rotation AX1. Nevertheless, in a variant, the outlet shaft 2 could be fastened to the first secondary toothed wheel 23 in order to be constrained in rotation therewith about the second axis of rotation AX2.

Consequently, the drive shaft 4 is fastened to the second secondary toothed wheel 24 in order to be constrained in rotation therewith about the second axis of rotation AX2. Nevertheless, in a variant, the drive shaft could be fastened to the second primary toothed wheel 14 in order to be constrained to rotate therewith about the first axis of rotation AX1.

In the method advantageously implemented by the powerplant 8, both the clutch 15 and the declutchable freewheel 25 are declutched during starting.

This operation can be implemented by the pilot making use of a manual control, or by automatic control means 30 connected to the clutch 15 and to the declutchable freewheel 25. In the automatic variant, the control means 30, such as a computer, are connected to a sensor 31, such as a torque sensor, for example, in order to determine the operating stage of the powerplant, i.e. a starting stage, an intermediate stage of operation at low torque during which the engine is developing a low level of torque, or a stabilized stage of operation at high torque during which the engine is developing a high level of torque.

The outlet shaft 2 of the engine 1 then sets the first primary and secondary shafts 11 and 21 into rotation via the first and third toothed wheels 13 and 23.

The clutch 15 is declutched and the declutchable freewheel 25 is declutched, so the second primary and secondary shafts 12 and 22 are not driven in rotation, which means that the drive shaft 4, the main gearbox 5, and the main rotor 6 remain stationary.

The engine manufacturer defines a minimum idling speed for said engine 1, and once it reaches its minimum idling speed, and thus a idling torque level, the low-torque operating stage begins, during which there is no longer any need to make use of a starter.

The control means 30 are then used to engage the clutch 15 so that its driving part 15' comes into contact with its driven part 15". The second primary shaft 12 then begins to rotate and act via the second and fourth toothed wheels 14 and 24 to drive the drive shaft 4 together with the main gearbox 5 and the main rotor 6 of the mechanical system 7.

Furthermore, the second secondary shaft 22 is also set into rotation. Nevertheless, it should be observed that the driving and drivable portions 25' and 25" of the declutchable freewheel 25 are not mutually engaged since the declutchable freewheel 25 is still declutched.

Since the torque is low, a clutch 15 of reasonable dimensions suffices to achieve operation without slip, and thus to transmit an optimum torque level lying between the idling torque level and a maximum torque level as developed by the engine 1. By way of example, the manufacturer determines the clutch to be used and thus said optimum torque level, as a function of the available space.

Conditions are completely different when the engine 1 is developing a high level of torque.

Consequently, when the torque developed by the engine reaches said optimum torque of said clutch, at the beginning of the stabilized operation stage, the clutch 15 is declutched so as to separate its driving part 15' from its driven part 15".

Simultaneously or in succession, the declutchable freewheel 25 is clutched. It should be observed that because of the various numbers of teeth of the toothed wheels 13, 14, 23, and 24, the second secondary shaft 22 and the drivable portion 25" associated with the declutchable freewheel 25 rotate more quickly than the first secondary shaft 21 and the driving portion 25' associated with the declutchable freewheel 25.

Consequently, the outlet shaft 2 no longer drives the drive shaft 4 in rotation during a short transient stage.

The speed of rotation of the drive shaft 4, of the fourth toothed wheel 24, of the second secondary shaft 22, and of the drivable portion 25" then drops and will drop below the speed of rotation of the driving portion 25' of the declutchable freewheel 25.

Since the declutchable freewheel 25 is declutched, the driving portion 25' of the declutchable freewheel 25 will thus set the drivable portion 25" of the declutchable freewheel 25 into rotation. Thus, at the end of the transient stage of the stabilized operating stage, the outlet shaft 2 sets the drive shaft 4 into motion successively via the first toothed wheel 13, the third toothed wheel 23, the first secondary shaft 21, the declutchable freewheel 25, the second secondary shaft 22, and the fourth toothed wheel 23.

Finally, it should be observed that the method of the invention is reversible. Thus, in order to switch off the engine, it is possible to perform the above-described operations in the opposite order.

Naturally, the present invention may be subjected to numerous variants as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A powerplant provided with a drive shaft and at least one engine having an outlet shaft necessarily set into rotation on starting said engine, said drive shaft setting a mechanical system having a main rotor into motion, said engine being a turbine engine having a linked turbine or a piston engine, wherein the powerplant includes a link member provided with a clutch, a declutchable freewheel for linking said outlet shaft mechanically to said drive shaft, and control means, said declutchable freewheel operates either in a disconnected mode during which a driving portion of the declutchable freewheel can under no circumstances set a drivable portion of said declutchable freewheel into motion, or in a freewheel mode during which the driving portion sets the drivable portion into motion as soon as a first speed of rotation of the driving portion becomes greater than a second speed of rotation of the drivable portion, whereas in contrast the driving portion is not setting said drivable portion into rotation when the first speed of rotation is lower than the second speed of rotation;

wherein said engine has a first torque level associated with an idling speed and a second torque level associated with a maximum torque output of the engine;

wherein said clutch has an operating torque threshold between the first and second torque levels;

wherein said control means is configured to operate the powerplant in a starting stage to start the engine after declutching said clutch and declutching said declutchable freewheel so as to disconnect said outlet shaft from said drive shaft such that the main rotor is unpowered;

wherein said control means is configured to, in response to the engine torque being greater than the first torque level and less than the operating torque threshold, operate the powerplant in an intermediate stage by clutching said clutch and keeping said declutchable freewheel declutched to connect said outlet shaft to said drive shaft solely via said clutch to rotate the main rotor using the engine; and wherein said control means is configured to, in response to the engine torque being greater than the operating torque threshold, operate the powerplant in a stabilized stage by declutching said clutch and clutching said declutchable freewheel so as to connect said outlet shaft to said drive shaft via said declutchable freewheel to rotate the main rotor using the engine.

2. A powerplant according to claim 1, wherein said declutchable freewheel comprises the driving portion, the drivable portion, and a plurality of rollers placed in a cage so as to be capable of being moved longitudinally.

3. A powerplant according to claim 1, wherein said link member links said outlet shaft mechanically to said drive shaft either via said clutch, or via said declutchable freewheel.

4. A powerplant according to claim 1, wherein said link member comprises:

first and second primary shafts secured to said clutch, said first primary shaft being provided with a first primary toothed wheel having a first number of teeth (P1), and said second primary shaft being provided with a second primary toothed wheel having a second number of teeth (P2); and first and second secondary shafts secured to said declutchable freewheel, said first secondary shaft being provided with a first secondary toothed wheel provided with a third number of teeth (R1) meshing with said first primary toothed wheel, said second secondary shaft being provided with a second secondary toothed wheel provided with a fourth number of teeth (R2) meshing with said second primary toothed wheel.

5. A powerplant according to claim 4, wherein said first and second primary shafts are located on a first common axis of rotation (AX1), and said first and second secondary shafts are located on a second common axis of rotation (AX2), said first and second primary shafts being parallel to said first and second secondary shafts.

6. A powerplant according to claim 4, wherein a first quotient (Q1), given by the third number of teeth (R1) divided by the first number of teeth (P1), is greater than unity, and the product of said first quotient (Q1) multiplied by a second quotient (Q2), given by the second number of teeth (P2) divided by the fourth number of teeth (R2), is also greater than unity.

7. A powerplant according to claim 4, wherein said outlet shaft is constrained to rotate with the first primary toothed wheel or with the first secondary toothed wheel.

8. A powerplant according to claim 4, wherein said drive shaft is constrained to rotate with the second primary toothed wheel or with the second secondary toothed wheel.

9. A powerplant according to claim 1, including at least one control means for controlling said clutch and said declutchable freewheel.

10. The powerplant according to claim 1, wherein the mechanical system is provided with a rotor for a rotorcraft.

11. A rotorcraft comprising:
a engine having an outlet shaft, the engine is configured to be started by rotating the outlet shaft using a starter, wherein the engine has a first torque level associated with an idling speed and a second torque level associated with a maximum torque output of the engine;
a mechanical system having a drive shaft, a gearbox and a rotor;
a link member mechanically connecting the outlet shaft of the engine to the drive shaft, the link member comprising a clutch and a declutchable mechanical freewheel, wherein the freewheel has a disconnected mode where the speed of a driving portion of the freewheel is independent of a driven portion of the freewheel and a freewheel mode where the driving portion of the freewheel propels the driven portion when the freewheel is clutched and a speed of rotation of the driving portion is greater than a speed of rotation of the driven portion, wherein the driving portion freewheels in the freewheel mode when the freewheel is clutched and a speed of rotation of the driving portion is less than a speed of rotation of the driven portion to enable autorotation of the rotor, wherein the clutch has an operating torque threshold between the first and second torque levels of the engine; and
a controller configured to (i) operate the rotorcraft in a starting stage to start the engine after declutching said clutch and declutching said declutchable freewheel so as to disconnect said outlet shaft from said drive shaft such that the main rotor is unpowered, (ii) in response to the engine torque being greater than the first torque level and less than the operating torque threshold, operate the rotorcraft in an intermediate stage by clutching said clutch and keeping said declutchable freewheel declutched to connect said outlet shaft to said drive shaft solely via said clutch to rotate the main rotor using the engine and prevent autorotation of the main rotor, and (iii) in response to the engine torque being greater than the operating torque threshold, operate the rotorcraft in a stabilized stage by declutching said clutch and clutching said declutchable freewheel so as to connect said outlet shaft to said drive shaft via said declutchable freewheel to rotate the main rotor using the engine.

12. The rotorcraft of claim 11 wherein the declutchable freewheel has a plurality of rollers placed in a cage, the cage adapted to move longitudinally with respect to the freewheel;
wherein the rollers are withdrawn away from the driving and driven portions for the disconnected mode of the freewheel such that the driving and driven portions are unconstrained with respect to one another; and
wherein the rollers are positioned between and engaged with the driving and driven portions for the freewheel mode of the freewheel.

13. The rotorcraft of claim 11 wherein the output shaft of the engine has a first axis of rotation and the drive shaft of the mechanical system has a second axis of rotation spaced apart from the first axis;
wherein the link member has first and second primary shafts connected to the clutch and rotating about the first axis of rotation, the first primary shaft having a first primary toothed wheel with a first number of teeth (P1), the second primary shaft having a second primary toothed wheel with a second number of teeth (P2);
wherein the link member has first and second secondary shafts connected to the declutchable freewheel and rotating about the second axis of rotation, the first secondary shaft having a first secondary toothed wheel with a third number of teeth (R1), the second secondary shaft having a second secondary toothed wheel with a fourth number of teeth (R2);
wherein the first primary toothed wheel is in meshed engagement with the first secondary toothed wheel, and the second primary toothed wheel is in meshed engagement with the second secondary toothed wheel; and
wherein the output shaft of the engine is permanently fixed for rotation with the first primary shaft of the link member.

14. The rotorcraft of claim 11 wherein the declutchable mechanical freewheel is positioned in the disconnected mode by mechanically disengaging the driving portion and the driven portion of the freewheel.

15. The rotorcraft of claim 11 wherein the driving portion and the driven portion of the declutchable freewheel are in mechanical contact with one another in the freewheel mode; and wherein the driving portion and the driven portion of the freewheel are physically separated from one another in the disconnected mode.

16. A powerplant according to claim 1, wherein the outlet shaft of the engine is configured to provide torque solely to the link member.

17. A method of controlling a rotorcraft having an engine with an outlet shaft, a mechanical system having a drive shaft, a gearbox and a rotor, and a link member mechanically connecting the outlet shaft of the engine to the drive shaft, the method comprising:
a first step of declutching a clutch of the link member and declutching a declutchable freewheel of the link member to disconnect the outlet shaft from the drive shaft when the engine speed is less than a minimum idling speed to start the engine with the mechanical system undriven and the rotor unpowered;
a second step of engaging the clutch and declutching the declutchable freewheel such that the drive shaft is solely driven by the outlet shaft via the clutch when the engine speed is at least the minimum idling speed and the engine torque is less than an optimum torque of the clutch to rotate the rotor; and
a third step of declutching the clutch and clutching the declutchable freewheel such that the drive shaft is solely driven by the outlet shaft via the declutchable freewheel when the engine speed is at least the minimum idling speed and the engine torque is greater than an optimum torque of the clutch to rotate the rotor and enable autorotation of the rotor;
wherein the first step, second step and third step, in that order, are performed to start the engine and operate the rotorcraft; and
wherein the third step, second step, and first step, in that order, are performed to switch off the engine.

18. A method according to claim 17, wherein a second step of engaging the clutch and declutching the declutchable freewheel prevents autorotation of the main rotor.

* * * * *